US010668522B2

(12) United States Patent
Gostylla et al.

(10) Patent No.: US 10,668,522 B2
(45) Date of Patent: Jun. 2, 2020

(54) MOUNTING ASSEMBLY

(71) Applicant: Henrob Limited, Flintshire (GB)

(72) Inventors: Wojciech Gostylla, Queensland (AU); Stuart Edmund Blacket, Queensland (AU)

(73) Assignee: Atlas Copco IAS UK Limited, Flintshire (GB)

( * ) Notice: Subject to any disclaimer, the term of this patent is extended or adjusted under 35 U.S.C. 154(b) by 346 days.

(21) Appl. No.: 15/110,433

(22) PCT Filed: Jan. 16, 2015

(86) PCT No.: PCT/GB2015/050083
§ 371 (c)(1),
(2) Date: Jul. 8, 2016

(87) PCT Pub. No.: WO2015/107351
PCT Pub. Date: Jul. 23, 2015

(65) Prior Publication Data
US 2016/0325341 A1 Nov. 10, 2016

(30) Foreign Application Priority Data

Jan. 16, 2014 (GB) .................................. 1400725.6
Jan. 16, 2014 (GB) .................................. 1400734.8
(Continued)

(51) Int. Cl.
B25B 27/14 (2006.01)
B21J 15/26 (2006.01)
(Continued)

(52) U.S. Cl.
CPC .............. B21J 15/26 (2013.01); B21D 39/03 (2013.01); B21J 15/025 (2013.01); B21J 15/027 (2013.01);
(Continued)

(58) Field of Classification Search
CPC ... B23Q 3/06; B23P 11/00; B25B 3/00; B25B 5/067; B25B 5/082
See application file for complete search history.

(56) References Cited

U.S. PATENT DOCUMENTS 1,404,126 A 1/1922 Krause
2,743,623 A 5/1956 Wells
(Continued)

FOREIGN PATENT DOCUMENTS

CN 1078672 A 11/1993
CN 101433935 5/2009
(Continued)

OTHER PUBLICATIONS

Chinese Patent First Office Action for Application No. 2015800047956 dated Apr. 3, 2018 (8 pages including English translation).
(Continued)

Primary Examiner — Lee D Wilson
(74) Attorney, Agent, or Firm — Michael Best & Friedrich LLP

(57) ABSTRACT

A mounting assembly for a spot-joining apparatus comprises a first support arm (24). The first support arm (24) has a mounting surface (26), and receiving portion configured to receive an actuator or an anvil. The mounting assembly also comprises an alignment bracket (28) configured to engage with the actuator or anvil. The alignment bracket (28) is movable between a plurality of locations on the mounting surface (26) of the first support arm (24). The mounting assembly further comprises a clamp assembly (52, 29, 66a, 66b, 70, 70b or 52, 29, 88, 92, 98, 90, 96) configured to secure the alignment bracket (28) in any of the plurality of locations.

21 Claims, 11 Drawing Sheets

(30) Foreign Application Priority Data

| Jan. 16, 2014 | (GB) | ................................... | 1400736.3 |
| Jan. 16, 2014 | (GB) | ................................... | 1400761.1 |

(51) Int. Cl.

| B23K 26/352 | (2014.01) |
| H02K 41/02 | (2006.01) |
| B21D 39/03 | (2006.01) |
| B21J 15/02 | (2006.01) |
| B21J 15/10 | (2006.01) |
| B23K 20/12 | (2006.01) |
| B23K 20/227 | (2006.01) |
| B23K 20/233 | (2006.01) |
| B23K 20/24 | (2006.01) |
| F16B 5/08 | (2006.01) |
| F16H 25/20 | (2006.01) |
| B23K 103/18 | (2006.01) |
| B23K 103/10 | (2006.01) |
| B23K 103/16 | (2006.01) |
| B23K 103/20 | (2006.01) |
| B23K 103/00 | (2006.01) |
| B23K 103/04 | (2006.01) |
| B23K 103/24 | (2006.01) |
| B23K 103/14 | (2006.01) |
| B23K 101/00 | (2006.01) |
| B23K 103/08 | (2006.01) |

(52) U.S. Cl.
CPC ............ *B21J 15/10* (2013.01); *B23K 20/127* (2013.01); *B23K 20/1265* (2013.01); *B23K 20/227* (2013.01); *B23K 20/2333* (2013.01); *B23K 20/24* (2013.01); *B23K 26/352* (2015.10); *F16B 5/08* (2013.01); *F16H 25/2025* (2013.01); *H02K 41/02* (2013.01); *B23K 2101/006* (2018.08); *B23K 2103/04* (2018.08); *B23K 2103/05* (2018.08); *B23K 2103/10* (2018.08); *B23K 2103/14* (2018.08); *B23K 2103/15* (2018.08); *B23K 2103/16* (2018.08); *B23K 2103/172* (2018.08); *B23K 2103/18* (2018.08); *B23K 2103/20* (2018.08); *B23K 2103/24* (2018.08); *B23K 2103/34* (2018.08); *B23K 2103/42* (2018.08)

(56) References Cited

U.S. PATENT DOCUMENTS

| 3,092,378 | A | * | 6/1963 | Aulner | ................... | B25B 5/125 |
| | | | | | | 269/143 |
| 3,127,044 | A | | 3/1964 | Brown | | |
| 4,218,953 | A | | 8/1980 | Haytayan | | |
| 4,756,072 | A | | 7/1988 | Falzoni | | |
| 4,762,261 | A | | 8/1988 | Hawly et al. | | |
| 5,183,357 | A | | 2/1993 | Palm | | |
| 5,256,017 | A | | 10/1993 | Smirnov et al. | | |
| 5,354,160 | A | | 10/1994 | Pratt et al. | | |
| 5,423,525 | A | * | 6/1995 | Spainhower | ............ | B25B 1/125 |
| | | | | | | 269/174 |
| 5,752,305 | A | | 5/1998 | Cotterill et al. | | |
| 5,829,115 | A | | 11/1998 | Speller et al. | | |
| 6,179,192 | B1 | | 1/2001 | Chopp | | |
| 6,234,034 | B1 | | 5/2001 | Ando | | |
| 6,988,862 | B1 | | 1/2006 | Lguchi et al. | | |
| 7,032,296 | B2 | | 4/2006 | Zdravkovic et al. | | |
| 8,302,273 | B2 | | 11/2012 | Muller | | |
| 8,413,532 | B2 | | 4/2013 | Wu | | |
| 8,549,723 | B2 | | 10/2013 | Condliff | | |
| 2001/0003859 | A1 | | 6/2001 | Mauer et al. | | |
| 2002/0125297 | A1 | | 9/2002 | Stol et al. | | |
| 2002/0166221 | A1 | | 11/2002 | Clew | | |
| 2003/0029903 | A1 | | 2/2003 | Kashiki et al. | | |
| 2003/0051332 | A1 | | 3/2003 | Stevenson et al. | | |
| 2003/0154588 | A1 | | 8/2003 | Blacket et al. | | |
| 2004/0096295 | A1 | | 5/2004 | Stevenson et al. | | |
| 2004/0118900 | A1 | | 6/2004 | Stevenson et al. | | |
| 2007/0017078 | A1 | * | 1/2007 | Kolano | .................. | B25B 27/26 |
| | | | | | | 29/219 |
| 2007/0034662 | A1 | | 2/2007 | Opper et al. | | |
| 2007/0262506 | A1 | * | 11/2007 | Alberti | ................... | B25B 5/067 |
| | | | | | | 269/249 |
| 2008/0056842 | A1 | | 3/2008 | Stevenson et al. | | |
| 2008/0093420 | A1 | | 4/2008 | Mauer | | |
| 2010/0088880 | A1 | | 4/2010 | Wang et al. | | |
| 2011/0016939 | A1 | * | 1/2011 | Clew | ................... | B21D 39/031 |
| | | | | | | 72/31.01 |
| 2011/0164945 | A1 | | 7/2011 | Lathabai et al. | | |
| 2011/0304231 | A1 | | 12/2011 | Wu | | |
| 2012/0167366 | A1 | | 7/2012 | Mauer et al. | | |
| 2013/0273312 | A1 | | 10/2013 | Campbell et al. | | |
| 2014/0222011 | A1 | | 8/2014 | Keller et al. | | |
| 2015/0328676 | A1 | | 11/2015 | Zinn et al. | | |
| 2016/0158925 | A1 | * | 6/2016 | Robb, Jr. | ................ | F16C 17/10 |
| | | | | | | 29/257 |
| 2016/0325341 | A1 | * | 11/2016 | Gostylla | ................ | B21D 39/03 |
| 2018/0117666 | A1 | | 5/2018 | Trinick | | |

FOREIGN PATENT DOCUMENTS

| CN | 201246383 Y | 5/2009 |
| CN | 101451599 | 6/2009 |
| CN | 101468421 | 7/2009 |
| CN | 101537252 | 9/2009 |
| CN | 101817142 | 9/2010 |
| CN | 101829903 A | 9/2010 |
| CN | 102686329 A | 9/2012 |
| CN | 202481711 | 10/2012 |
| CN | 103228375 | 7/2013 |
| CN | 103240564 | 8/2013 |
| CN | 103260790 A | 8/2013 |
| CN | 203253869 | 10/2013 |
| CN | 103990756 | 8/2014 |
| DE | 19743277 A1 | 5/1999 |
| DE | 102004015568 | 10/2005 |
| DE | 102010046318 | 3/2012 |
| FR | 993420 A | 10/1951 |
| JP | S594981 A | 1/1984 |
| JP | H01254342 | 10/1989 |
| JP | 2002174219 | 6/2002 |
| JP | 2002229639 A | 8/2002 |
| JP | 2002364617 | 12/2002 |
| JP | 2005291382 | 10/2005 |
| JP | 2006043769 A | 2/2006 |
| JP | 4517362 B2 | 8/2010 |
| JP | 5055104 | 10/2012 |
| JP | 2013148122 A | 8/2013 |
| KR | 10/2004/090612 | 10/2004 |
| KR | 10 2011 0036 624 | 4/2011 |
| KR | 10 2011 0131 826 | 12/2011 |
| KR | 10 2013 0070 362 | 6/2013 |
| KR | 10 2013 0134 180 | 12/2013 |
| KR | 10 2013 0140 711 | 12/2013 |
| WO | 94/14554 | 7/1994 |
| WO | 2009137868 A1 | 7/1994 |
| WO | WO9414554 | 7/1994 |

OTHER PUBLICATIONS

Korean Decision to Grant for Application No. KR10-2016-7021130 dated Feb. 23, 2018 (6 pages including statement of relevance).
Office Action from the Korean Intellectual Property Office for Application No. 10-2016-7021078 dated Jul. 10, 2017 (5 pages).
First Office Action from the State Intellectual Property Office of China for Application No. 10-2016-7021130 dated Jul. 18, 2017 (3 pages).
First Office Action from the State Intellectual Property Office of China for Application No. 10-2016-7021353 dated Jul. 18, 2017 (15 pages).

(56) References Cited

OTHER PUBLICATIONS

Lathabai et al, "Friction spot joining of an extruded Al—Mg—Si alloy," journal (2006) pp. 899-902 Science Direct, www.actamat-journals.com, Available online Aug. 22, 2006.
PCT/GB2015/050085 International Search Report dated Apr. 8, 2015 (6 pages).
PCT/GB2015/050084 International Search Report dated Apr. 20, 2015 (5 pages).
PCT/GB2015/050082 International Search Report and Written Opinion dated Jun. 9, 2015 (17 pages).
Second Office Action issued by the Chinese Patent Office for related Application No. 201580013385.8 dated Aug. 31, 2018 (26 pages including English translation).
Japan Office Action Summary for related Application No. 2016-564425 dated Oct. 2, 2018 (1page).
Japan Office Action for related Application No. 2016-564424 dated Nov. 13, 2018 (8 pages including English translation).
Japan Office Action Summary for related Application No. 2016-564426 dated Dec. 4, 2018 (1 page).
Japan Office Action for related Application No. 2016-5644243 dated Jan. 15, 2019 (5 pages including English translation).
International Search Report and Written Opinion for International Application No. PCT/GB2015/050083 dated Mar. 27, 2015 (12 pages).
Chinese First Office action for Application No. 20150004824.9 dated Sep. 29, 2017 (8 pages English translation included).
Chinese First Office action for Application No. 201580013385.8 dated Oct. 30, 2017 (21 pages English translation included).
Chinese First Office action for Application No. 2015800049330 dated 4th Dec. 4, 2017 (7 pages English translation included).
Second Office Action issued by the Chinese Patent Office for related Application No. 201580004795.6 dated Feb. 19, 2019 (10 pages including English translation).
European Search Report for related Application No. 15701570.2 dated Sep. 9, 2019 (9 Pages).
Third Office Action issued by the Chinese Patent Office for related Application No. 201580013385.8 dated Dec. 3,2019 (27 pages including English summary).

\* cited by examiner

MOUNTING ASSEMBLY

The present invention relates to a mounting assembly of the kind that may be used in a spot-joining apparatus such as a self-piercing riveting tool.

Self-piercing riveting (SPR) is a spot-joining technique in which a self-piercing rivet is driven, by a punch, into a layered workpiece supported on a die. The die is shaped so that as the rivet is driven into the workpiece towards the die, the material of the workpiece plastically deforms. This flow of workpiece material causes the annular tip of the rivet to flare outwards and remain encapsulated by an upset annulus of the workpiece material. The flared tip of the rivet interlocking with the upset annulus of the workpiece prevents removal of the rivet or separation of the layers of the workpiece.

Insertion of a rivet into the workpiece is performed using a linear actuator (such as a hydraulic cylinder or an electric linear actuator) which is mounted on a support arm of a force reaction frame opposite an anvil mounted on another support arm of the force reaction frame. The linear actuator drives the punch and rivet towards a stationary workpiece and die, or drives the die and workpiece towards a stationary rivet and punch.

An important factor in the performance of spot-joining techniques such as SPR is the ability of the force reaction frame to hold the punch and the die in alignment, as misalignment of these components can produce an unsatisfactory joint. For instance, if a rivet is driven towards the die off-centre, the flow of plastically deformed material may be disrupted. This disrupted flow may prevent the rivet from being upset correctly, spoiling the joint.

In addition, force reaction frames are often subjected to relatively high loading as the punch drives the rivet. This high loading can cause the frames to warp over time, spoiling previously correct alignment. Force reaction frames for spot-joining techniques such as SPR must therefore be very strong, but also manufactured to great precision. These constraints have a significant impact on the frames' cost of manufacture. Further, the precision required of the frames can mean that a previously satisfactory frame must be replaced if it is subjected to an accidental impact during shop-floor activities.

A similar problem also exists where spot-joining tools are manipulated by robotic arms. The arm is programmed on the basis that the actuator and/or anvil it manipulates is aligned with a certain point in space, and before affecting a spot joining operation the robotic arm positions this point at the required location on a workpiece. If the actuator and/or anvil is not in fact aligned with this point, when the robotic arm positions that point in the correct location on the workpiece the actuator and/or anvil will be aligned with a different point on the workpiece. The tool will therefore produce a joint at an incorrect location. This may pose an additional problem for spot-joining techniques where a punch and die must also be aligned, and can also be of concern in relation to spot-joining techniques which may not use a die, such as blind riveting.

Conventionally, the actuators used in spot-joining techniques such as SPR are mounted to the force reaction frame using a lock-nut. The frame has a through-bore within which the actuator is received with minimal clearance (the alignment of the actuator thus being determined by the alignment of the bore). The actuator has a shoulder which rests on one end of the bore (the end furthest from the output shaft of the actuator), and an externally-threaded portion which protrudes from the other end of the bore. The actuator is held in position by screwing a lock-nut onto the threaded portion of the actuator until it contacts the support arm.

One problem with this method of securing the actuator is that the nut must be extremely tight. During insertion of a rivet, as the punch or die is driven forwards the actuator is pushed backwards with equal force. The nut must supply sufficient axial force to prevent this backward force from lifting the shoulder of the actuator off the support arm. If the shoulder lifts from the support arm, even by a very small amount, this provides the opportunity for fretting, which in turn can affect the strength of the load bearing parts and cause the actuator to weld itself into the bore making removal very difficult. In recent years the amount of force supplied by the actuator, i.e. the amount of backward force acting to lift the actuator's shoulder from the support arm, has increased. The required tightness of the nut has therefore increased similarly. In some situations this increased force cannot be accommodated because if the nut was tightened to the required extent, its threads would cam the threaded portion of the actuator inwards, crushing the actuator and impairing its function.

Even where the actuator is of sufficient strength to allow the lock-nut to be tightened sufficiently, the amount of torque with which the nut must be tightened may be beyond that which an assembly worker can generate with conventional tools. The nut must therefore be tightened using expensive and bulky powered machinery.

It is one object of the present invention to mitigate or obviate one or more of the aforesaid disadvantages, and/or to provide an improved or alternative force reaction frame, spot-joining apparatus, product or method of manufacturing a product.

According to a first aspect of the present invention there is provided a mounting assembly for a spot-joining apparatus, wherein the mounting assembly comprises a first support arm, the first support arm has a mounting surface, and receiving portion configured to receive an actuator, the mounting assembly also comprises an alignment bracket configured to engage with said actuator, the alignment bracket is movable between a plurality of locations on the mounting surface of the first support arm, and the mounting assembly further comprises a clamp assembly configured to secure the alignment bracket in any of said plurality of locations.

The alignment bracket being movable on the mounting surface may allow the location of an actuator to be adjusted, for instance to align it with an anvil or to align it with a point in space with which it should be aligned for correct robotic manipulation. The mounting assembly may therefore be manufactured to lower dimensional tolerances before being adjusted during assembly of a spot-joining apparatus to align an anvil and actuator. The mounting assembly may also be adjusted or re-adjusted in the event that it is warped by continuous use, which may allow it to be made less bulky (and therefore lighter), and/or made out of less expensive materials. Furthermore, the mounting assembly may be adjusted or re-adjusted after being deformed by an accidental collision, negating the requirement for a replacement to be purchased and reducing the down-time required to return the apparatus to service. The alignment bracket being movable on the mounting surface may provide an advantageously simple and easily operable mechanism for altering the location of an actuator.

The receiving portion may comprise a bore which is oversized relative to the actuator.

There may be one or more intermediate components, for instance spacers or sheets of high-friction material, positioned between the alignment bracket and mounting surface. The mounting surface may or may not be flat.

The anvil may be considered to be a component which brings about a spot joining operation when a component movable by the actuator is advanced towards it. For instance, in the case of SPR, where the actuator drives the punch and rivet towards a stationary workpiece and die, the die forms (or forms part of) the anvil. Similarly, where the actuator drives the die and workpiece towards a stationary rivet and punch, the punch forms (or forms part of) the anvil.

The receiving portion of the first support arm may be a bore (e.g. as illustrated in the FIG. 2). Alternatively, it may take any other suitable form such as an indentation, a groove, a pair of fingers configured to receive the actuator therebetween, or an array of lugs. The alignment bracket may have a positioning portion for engagement with an actuator, which may comprise one or more of the above structures or may have any other suitable form.

The alignment bracket may be movable to any location on the mounting surface within a continuum. This may place few constraints on the location of the alignment bracket, thereby affording good adjustability.

Alternatively, the alignment bracket may be movable to a plurality of discrete locations. For instance, it may be securable on the mounting surface using bolts. In this case it may be securable only in locations in which bolt holes on the alignment bracket and mounting surface are aligned.

Said plurality of locations may be spaced along a longitudinal axis of the first support arm. Alternatively or in addition, said plurality of locations may be spaced across the lateral width of the first support arm.

For instance, the plurality of locations may be spaced along the longitudinal axis of the first support arm at the same point along its lateral width, may be spaced across the lateral width of the first support arm at the same point along its longitudinal axis, or may be distributed about the length and width of the first support arm.

In the mounting assembly according to the first aspect of the invention the clamp assembly may comprise a mounting lug. The mounting lug may be securable relative to both the alignment bracket and the mounting surface. The alignment bracket may be movable between said plurality of locations on the mounting surface due to the mounting lug being movable relative to the alignment bracket, and/or the mounting surface, between a plurality of locations.

For instance, the mounting lug may be movable between three longitudinal locations relative to the mounting surface and the alignment bracket may be movable between three lateral locations relative to the mounting lug. In such a situation the alignment bracket would be securable on the mounting surface in nine different locations.

The mounting lug may be securable relative to the alignment bracket, and/or the mounting surface, using one or more set screws.

Use of set screws may provide an advantageously simple, and/or simple to operate, mechanism for securing the mounting lug.

Where the mounting lug is securable relative to the alignment bracket and/or the mounting surface using one or more set screws, it may be securable relative to said feature by another mechanism as well as by said one or more set screws.

The mounting lug may be securable relative to the alignment bracket, and/or the mounting surface, using one or more pairs of counterposed set screws.

Where the mounting lug is securable using one or more set screws or pairs of counterposed set screws, at least one of said set screws may be positioned to act on a wedge member, the wedge member having a cam surface positioned whereby tightening its associated set screw urges the mounting lug, and the alignment bracket and/or the mounting surface, to move relative to one another and thereby move the alignment bracket towards at least one of said plurality of locations In an alternative arrangement, the mounting lug, and/or the alignment bracket and/or mounting surface, may be provided with a cam surface positioned to be acted on directly or indirectly by one or more of said set screws.

Alternatively or in addition to set screws, the mounting lug may be securable relative to the alignment bracket, and/or the mounting surface, using one or more shims.

Use of shims may also provide an advantageously simple, and/or advantageously simple to operate, mechanism for securing the mounting lug.

In one such arrangement, the mounting lug is received within a cavity in the mounting surface, and positioned within the cavity by hammering wedge-shaped shims of appropriate size between the mounting lug and the walls of the cavity.

The alignment bracket or the mounting surface may define a guideway in which at least a portion of the mounting lug is slidably received, or the mounting lug may define a guideway in which at least a portion of the alignment bracket or first support arm is slidably received, the guideway being positioned to limit the relative motion of the mounting lug and the alignment bracket, or of the mounting lug and the mounting surface. For instance, the guideway may limit said relative motion to movement within a plane, or movement along a line.

The mounting assembly may further comprise an actuator retention assembly configured to clamp an actuator to the mounting assembly.

The actuator retention assembly may comprise a plurality of bolts and/or nuts positioned circumferentially around the actuator.

Securing the actuator using a plurality of bolts and/or nuts may remove the need for a lock-nut, thereby removing the possibility of the lock-nut crushing the walls of the actuator inwards, as described above. Further, the clamping force being supplied by a plurality of bolts and/or nuts may allow the load which must be applied to be shared between them. This may reduce the torque to which each bolt or nut must be tightened, allowing the clamping force to be generated by cumulative tightening of the nuts/bolts to torques which can be achieved by an assembly worker using standard tools.

The clamp assembly may comprise 2 bolts, 3 bolts, 4 bolts, or 5 or more bolts. The bolts may be substantially evenly spaced around the actuator. Where the bolts and/or nuts are positioned circumferentially around the actuator, they may or may not be substantially evenly circumferentially spaced around the actuator, and/or of substantially equal radial distance from the actuator.

The mounting assembly may further comprise a second support arm which has a receiving portion configured to receive the anvil, the mounting assembly defining a span between the receiving portion of the first support arm and the receiving portion of the second support arm.

The first and second support arms may project from a central hub, thereby forming a force reaction frame such as a C-frame.

Since the alignment bracket is positioned on the support arm which supports the actuator, this is beneficial in allowing the region of the mounting structure around the anvil to be of minimal size and therefore able to reach into small spaces in a workpiece.

The mounting surface may face away from the second support arm. This may allow the alignment bracket to be positioned outside the space between the support arms, providing easier access thereto and reducing the opportunity for the bracket to be knocked by a workpiece positioned between the support arms.

Alternatively, the mounting surface may be positioned such that it faces towards the second support arm, or may be positioned in any other suitable orientation.

The mounting surface may be substantially perpendicular to the span.

The mounting surface substantially being perpendicular to the span may allow the alignment bracket to be moved thereon without significantly altering its distance, in a direction parallel to the span, from the receiving portion of the second support arm. This may allow the alignment of an actuator and anvil to be adjusted without altering the distance therebetween. If adjusting the alignment of the actuator and anvil did significantly alter the distance therebetween, the operable stroke length of the actuator would also change significantly, which might necessitate recalibration of the actuator's control system so as to prevent over-penetration or under-penetration of subsequently-inserted rivets.

The first aspect of the invention may further comprise an actuator mounting assembly for a spot-joining apparatus, wherein the actuator mounting assembly comprises a first support arm, the first support arm comprises a mounting surface, and an actuator receiving portion configured to receive an actuator, the actuator mounting assembly further comprises an alignment bracket configured to engage with said actuator, the alignment bracket is movable between a plurality of locations on the mounting surface of the first support arm, and the actuator mounting assembly further comprises a clamp assembly configured to secure the alignment bracket in any of said plurality of locations.

According to a second aspect of the invention there is provided a spot-joining apparatus comprising an anvil, an actuator, a die, a punch for driving a fastener or affecting a clinching or spot-welding operation, and a mounting assembly according to the first aspect of the invention which comprises a second support arm, wherein the actuator is received by the receiving portion of the first support arm, and the anvil is received by the receiving portion of the second support arm, and one of the die and punch is mounted on the actuator so as to be movable thereby, and the other of the die and punch forms at least part of the anvil.

The second aspect of the invention may provide a spot-joining apparatus which can be manufactured at lower cost, and/or one which is more resilient to warping or accidental damage, for the reasons set out in relation to the first aspect of the invention.

Examples of fasteners which may be driven by the punch include self-piercing rivets, slug rivets, blind rivets, studs and welding slugs. The punch and die may be used to perform clinching.

The spot-joining apparatus of the second aspect of the invention may be a self-piercing riveting apparatus. In this case, there may be considered to be two different configurations of punch and die. In the first configuration the punch is mounted to the actuator and the anvil comprises the die, with the actuator engaged by an alignment bracket. In the second configuration the die is mounted to the actuator and the anvil comprises the punch, with the actuator engaged by an alignment bracket.

The mounting assembly may further comprise a second alignment bracket configured to engage with said actuator, the second alignment bracket being movable between a plurality of locations on a second mounting surface of the first support arm, the mounting assembly further comprising a clamp assembly configured to secure the second alignment bracket in any of said plurality of locations.

According to a third aspect of the present invention there is provided a method of manufacturing a product, the method comprising joining together two or more layers of a workpiece using an apparatus according to the second aspect of the invention.

The third aspect of the invention may provide a method of manufacturing a product in which the tooling costs are advantageously reduced, and/or one which is less susceptible to disruption due to force reaction frame warping or damage, for the reasons set out in relation to the first aspect of the invention.

According to a fourth aspect of the present invention there is provided a product comprising a workpiece formed from two or more layers joined together using an apparatus according to the second aspect of the invention and/or a method according to the third aspect of the invention.

The fourth aspect of the invention may provide a product which can be manufactured at advantageously reduced cost, and/or increased precision, for the reasons set out in relation to the first to third aspects of the invention.

In the third and/or fourth aspects of the invention, the product may be a vehicle (such as a motorcycle, car, van, lorry or aircraft). Examples of layers of a workpiece include the chassis of a vehicle, thermal/acoustic insulation panels and vehicle bodywork panels.

Specific embodiments of the present invention will now be described, by way of example only, with reference to the accompanying drawings in which.

Figure 1:
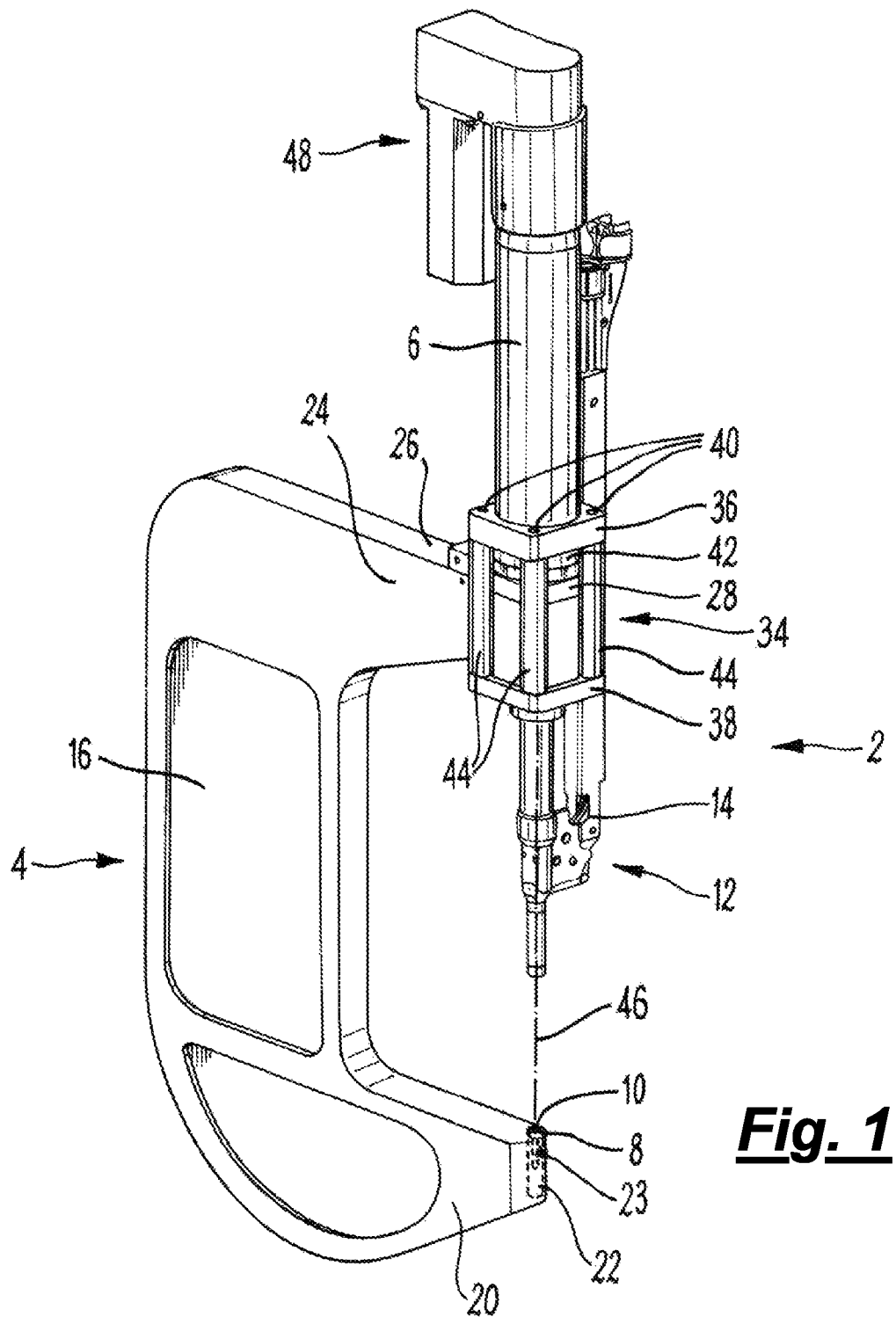
FIG. 1 is a perspective view of a tool head assembly of a first embodiment of the invention.

FIG. 1 shows a tool head assembly 2 of a spot-joining apparatus according to a first embodiment of the invention. The apparatus is a self-piercing riveting tool. The tool head assembly 2 may be manoeuvred relative to workpieces by a robotic arm, or fixed on a pedestal relative to which workpieces are moved. The tool head assembly comprises a mounting assembly in the form of a force reaction frame 4, an actuator 6 and an anvil 8. In this case, the anvil 8 comprises a die 10, and the actuator 6 drives a tool nose assembly 12 within which a punch (not visible) for driving a self-piercing rivet (not visible) is reciprocally disposed. The tool nose assembly has a rivet feed mechanism 14 by which rivets from a bulk source are consecutively presented to the punch for insertion into a workpiece. To rivet layers of a workpiece (not visible), the workpiece is supported on the die 10, and the actuator 6 advances the nose assembly 12 towards it. When the tip of the nose assembly 12 touches the workpiece (not visible), the punch moves downwards from within the nose and inserts the rivet into the workpiece to join the layers together as described above.

The force reaction frame 4 is substantially C-shaped (and may be referred to as a C-frame). The force reaction frame and comprises a hub portion 16, with a first support arm 24 and a second support arm 20 projecting therefrom. The second support arm 20 has an anvil receiving portion in the form of a through-bore 22, into which an elongate stem 23 of the anvil 8 is received. The stem 23 and through-bore 22 have an interference fit, so that the precise position of the die is determined by the position of the through-bore. As the location of the through-bore 22 is fixed, the position of the actuator 6 relative to the die 10 can only be adjusted via adjustment of the location of the actuator 6.

Figure 2:
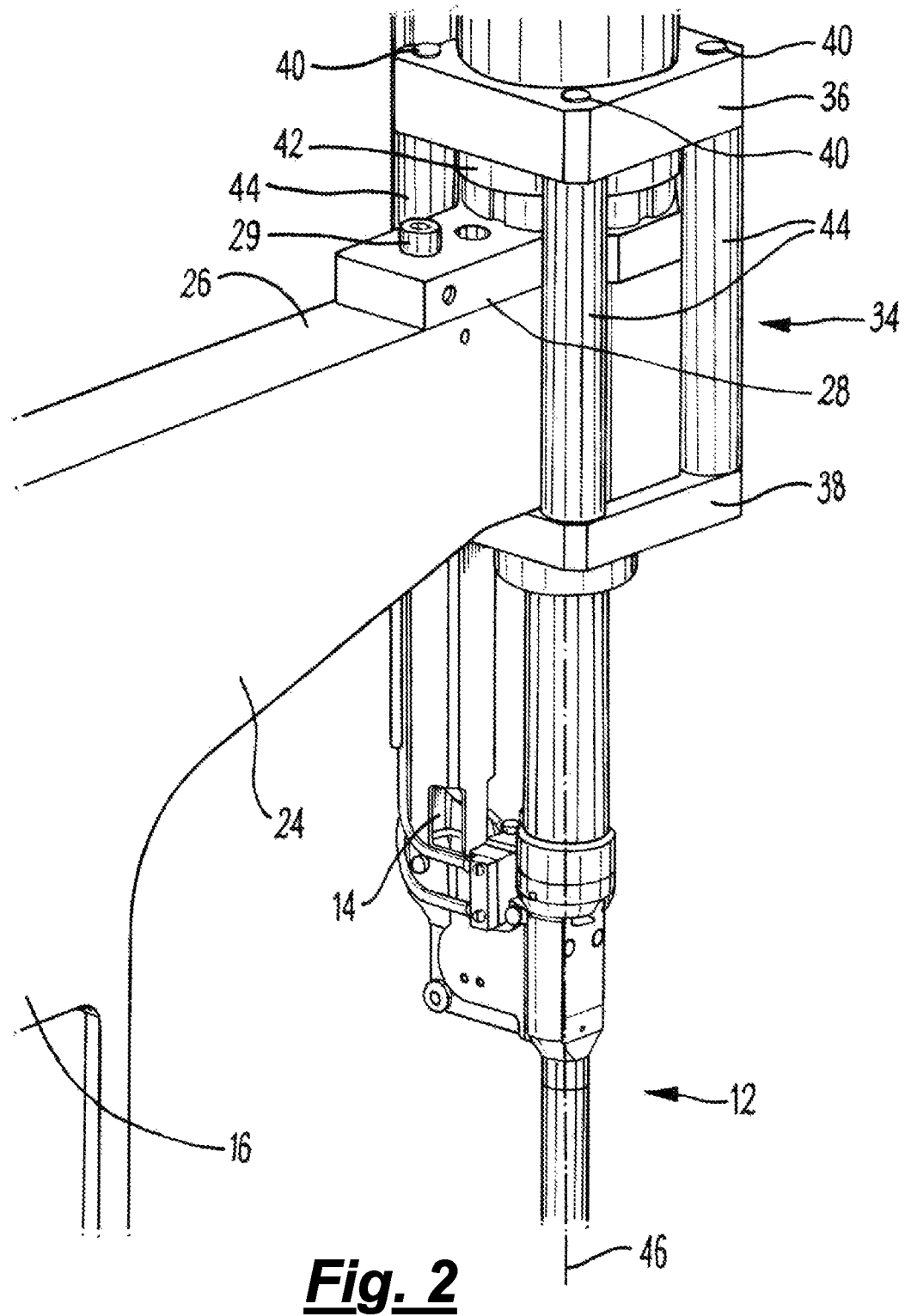
FIG. 2 is a perspective view of part of the tool head assembly of the first embodiment.
Figure 3:
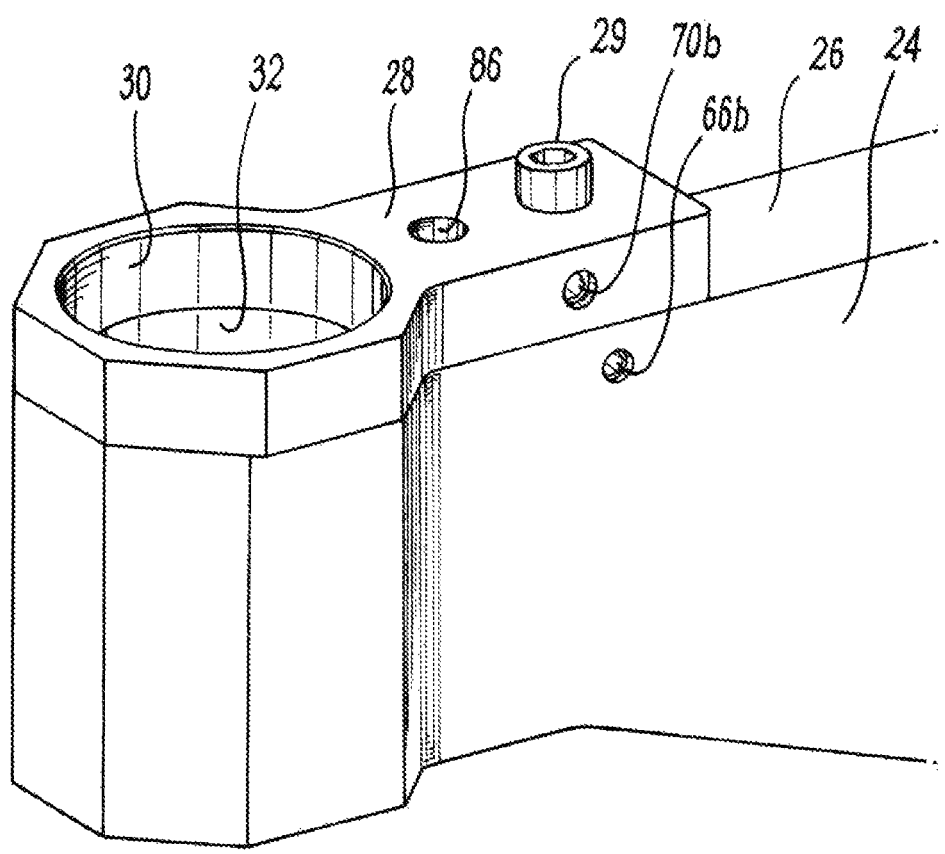
FIG. 3 is a perspective view of a first support arm of the first embodiment.

As shown in more detail in FIGS. 2 and 3 (the latter of which shows the first support arm 24 in isolation), the first support arm 24 has a mounting surface 26 on which an alignment bracket 28 is secured. In this embodiment the mounting surface 26 faces away from the second support arm 20. The alignment bracket 28 is held against the mounting surface 26 by a bolt 29 and has a positioning portion, in this case an actuator positioning portion in the form of an aperture 30, through which the actuator 6 can be snugly received. The aperture 30 is sized so that the actuator 6 can be received within it with an interference fit. When the actuator 6 is so received, the interference fit prevents it and the alignment bracket from moving relative to one another.

As shown in FIG. 3 the first support arm 24 also has a receiving portion, in this case an actuator receiving portion in the form of a bore 32, for receipt of the actuator 6 therethrough. This bore 32, however, is larger than the diameter of the aperture 30 in the alignment bracket 28. It is also larger than the actuator 6, therefore the actuator is movable laterally (up to a point) within this bore, by moving the alignment bracket as described in more detail below. The location of the actuator 6 (and thus the alignment of the actuator 6 and the die 8) is therefore determined by the location of the positioning portion 30 of the alignment bracket relative to the bore 32 of the first support arm 24, which in turn is determined by the location of the alignment bracket 28 on the mounting surface 26. The bore 32 may be referred to as an oversized bore (because it is significantly larger in diameter than the actuator 6 in order to allow lateral movement of the actuator in the bore).

Returning to FIGS. 1 and 2, the actuator 6 is fixed relative to the alignment bracket by an actuator retention assembly 34. The actuator retention assembly 34 comprises two flanges 36, 38, connected together by four bolts 40. The actuator 6 has a shoulder 42 which rests on the alignment bracket 28. One flange 36 is positioned on the opposite side of the shoulder 42 to the alignment bracket 28, and the other flange 38 is positioned on the opposite side of the first support arm 24 to the first flange 36. The flanges 36, 38 are connected by the bolts 40, each of which runs through a plain bore in flange 38, through an elastomeric protective sheath 44 and into a threaded bore in flange 36. Only the distal ends of the shanks of the bolts 40 are visible in FIGS. 1 and 2. The flanges 36, 38 and can be urged towards one another by tightening the bolts 40. As the flanges 36, 38 are urged towards one another, flange 38 braces against the first support arm 24 and flange 36 clamps the shoulder 42 of the actuator 6 against the alignment bracket 28, and thus the alignment bracket against the mounting surface 26. Typically bolts 40 are tightened to induce a load higher than the operating force of the actuator so that in service there is no axial movement of the actuator relative to the support member or the alignment bracket 28. Additionally, the bolt load always provides contact with the surfaces thereby providing frictional contact to prevent any lateral movement of the actuator 6 relative to the support member and the alignment bracket 28. Note, in theory the alignment bracket bolt 29 could be relaxed/removed once the bolts 40 of the actuator retention assembly have been torqued to their correct setting. In practice the bolt 29 retaining the alignment bracket 28 would be maintained to prevent any actuator lateral movement in the event the bolts 40 failed to function correctly. Since the bore 32 is oversized, it is not in contact with the walls of the actuator and therefore avoids fretting and seizing. The clamp up effect of bolts 40 is sufficient to provide an adequate coefficient of friction to prevent lateral movement even under full load.

Intelligent bolts (e.g. bolts provide with a strain gauge) can be used to monitor when the adequate torque is reached. An alternative method of gauging torque is to apply load monitoring washers under the bolt heads that may change colour when either adequate torque is reached or when overload conditions are experienced. Overload may occur due to over torquing or over exertion of the actuator in service. In service loads on the bolts can also be monitored actively by a strain gauge, the bolts being external and accessible makes this possible.

The position of the alignment bracket 28 can be preset using a mechanical alignment bar or a laser mounted temporarily in the alignment bracket. In this case the actuator 6 can be mounted to the alignment bracket 28, once the alignment bracket has been positioned, and the actuator retention assembly 34 tightened. The preset position of the alignment bracket 28 will maintain alignment. The mechanical alignment bar may comprise a rod extending from a holder which is configured to be received by the alignment bracket 28. The length of the rod may be such that it extends almost to a die on the opposite side of the C-frame, thereby allowing its position relative to the die to be determined easily. The laser may be provided in a holder which is configured to be received by the alignment bracket, the laser providing a laser beam which is directed towards the opposite side of the C-frame. A target may be provided at the location where the die will be fitted. The target may include a cross or other shape indicative of the point at which the centre of the die will be located when fitted (and onto which the laser beam should be directed).

If the actuator 6 is already mounted and it is desired to adjust its position, the actuator retention assembly 34 would be loosened and the alignment bracket 28 moved to adjust the nose of the actuator into alignment with the die (an alignment pin can be inserted into the nose and bought into engagement with the die recess). Where this approach is used there may be a risk that, due to the limited thickness of the alignment bracket 28 there is some play in the orientation of the actuator 6 relative to the alignment bracket (which may reduce the accuracy with which the actuator is aligned). To avoid or reduce this the alignment bracket 28 may comprise a clamp (not illustrated) to allow it to be clamped to the actuator 6. The clamp may for example comprise a split in the bracket which is at an opposite end of the bracket from the bolt 29. A bolt which passes through the alignment bracket on either side of the split may be tightened, thereby drawing the parts of the alignment bracket on either side of the split together. This will clamp the alignment bracket 28 against the actuator 6 thereby ensuring that there is no play between the alignment bracket and the actuator during alignment. Once alignment has been completed the actuator retention assembly 34 is tightened. The clamp may then be relaxed using the bolt. Alternatively, the clamp may remain tightened.

The force reaction frame 4 defines a span 46, between the actuator receiving portion 32 of the first support arm 24 and the anvil receiving portion 22 of the second support arm 20. In this embodiment, the mounting surface 26 is perpendicular to the span. For optimum performance, it is desired for the actuator 6 to be aligned such that its centreline (which in this case is the centreline of the punch) is collinear with the span 46. This is achieved by setting (or adjusting) the location in which the alignment bracket 28 is secured on the mounting surface 26, as outlined below.

Figure 4:
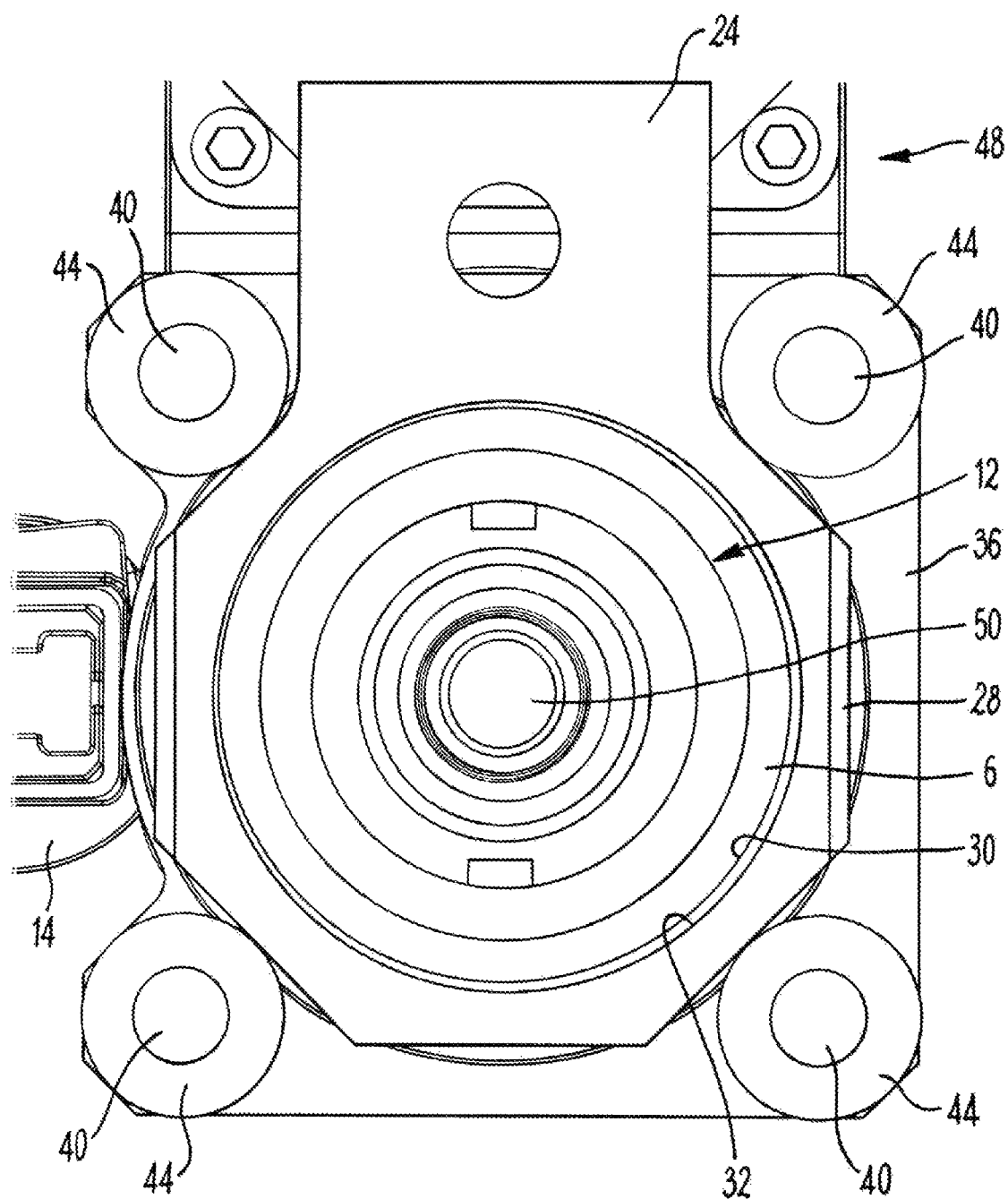
FIG. 4 is a vertical cross-section of part of the tool head assembly of the first embodiment, viewed from below.

FIG. 4 shows a cross-section through the first support arm 24 at a point between the two flanges of the actuator retention assembly 34, looking upwards from the perspective of FIGS. 1-3. The components at the top of FIG. 4 are parts of the motor assembly 48 of the actuator 6, visible at the top of FIG. 1. As described above, the bore 32 in the first support arm 24 is larger than the actuator 6 (at the relevant point along its length), allowing a degree of freedom of movement thereof. As described above, the location of the actuator 6 within the actuator receiving portion 32 can be adjusted by adjusting the location in which the alignment bracket 28 is secured on the mounting surface 26. As this figure illustrates, the alignment bracket 28 is secured on the mounting surface (26 in FIGS. 1-3) in a location in which the actuator is non-concentric with the bore 32 in the first support arm 24. This allows the actuator 6 to be aligned with the anvil (8 in FIG. 1) in the event that the anvil is not aligned with the central axis of the bore 32 in the first support arm 24. If the alignment of the actuator was determined by the location of the bore 32, as is the case in conventional force reaction frames, the anvil not being aligned with the central axis of the bore 32 may lead to the tool head assembly functioning improperly.

Figure 5:
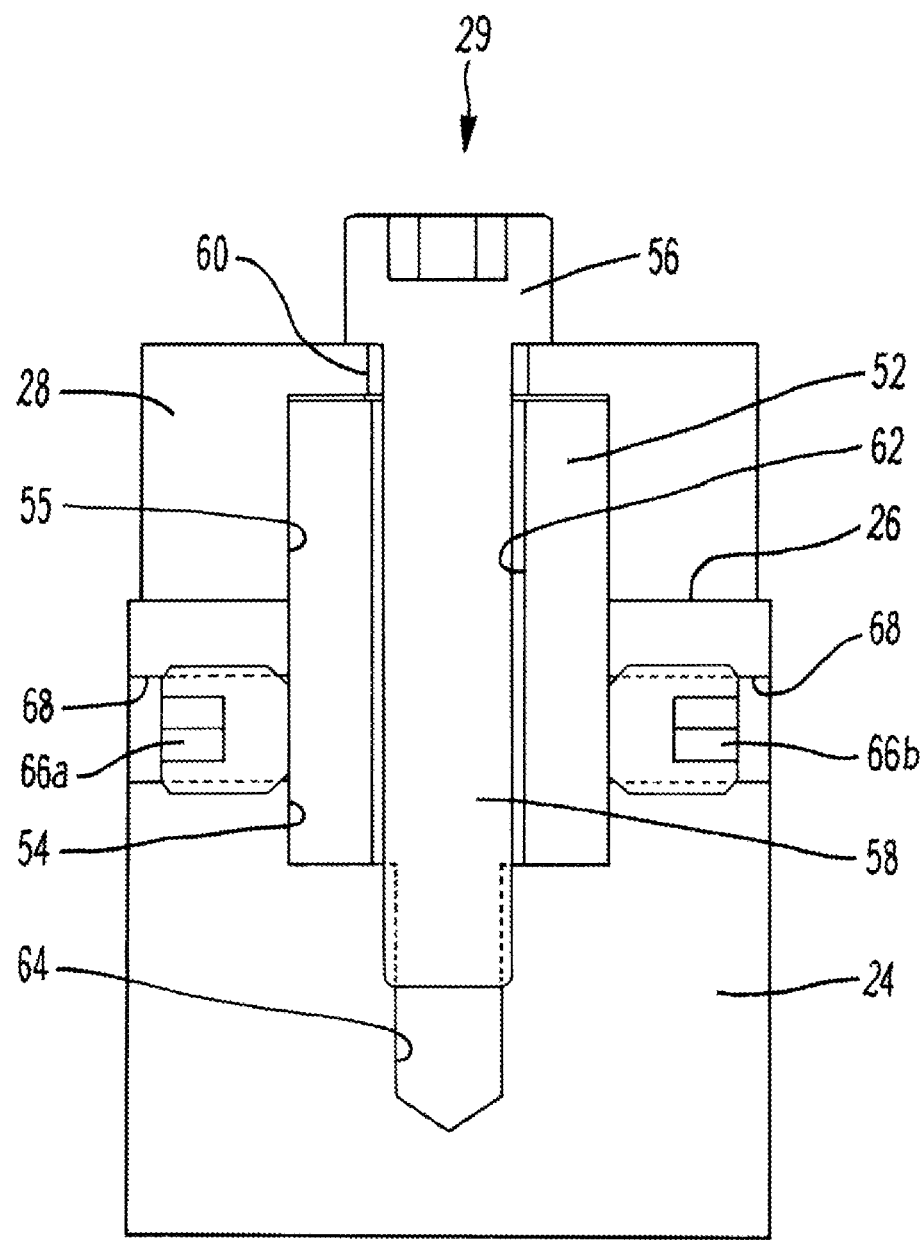
FIG. 5 is a longitudinal cross-section of the first support arm of the first embodiment.

FIG. 5 shows longitudinal cross-section through the first support arm 24, at the point along its length at which the bolt 29 (see FIG. 3) is positioned. In this embodiment, the alignment bracket 28 is secured on the mounting surface 26 via a mounting lug 52 which is received in a recess 54 in the mounting surface 26 (i.e. in the first support arm 24). The mounting lug 52 projects from the mounting surface 26 into a cavity 55 in the alignment bracket 28. As described above, the bolt 29 holds the alignment bracket 28 against the mounting surface 26. The head 56 of the bolt 29 is positioned to act on the alignment bracket 28, and the shank 58 of the bolt runs through a non-threaded aperture 60 in the alignment bracket, through a non-threaded aperture 62 in the mounting lug 52, and into a threaded aperture 64 the first support arm 24. To hold the alignment bracket 28 against the mounting surface 26, the bolt is tightened so that its head 56 urges the alignment bracket against the mounting surface 26 (downwards from the perspective of FIG. 5).

In this embodiment, the location in which the alignment bracket 28 is secured on the mounting surface 26 can be adjusted between locations across the lateral width (running from right to left from the perspective of FIG. 5) of the first support arm 24 by moving the mounting lug 52 relative to the first support arm 24, and between locations along the longitudinal length (into the page from the perspective of FIG. 5) of the first support arm by moving the alignment bracket 27 relative to the mounting lug 52. This adjustment may take place with the actuator and/or anvil in position, or both these components may be installed subsequently. FIG. 5 shows the mechanism by which the lateral location of the mounting lug 52 can be adjusted. The longitudinal length (into the page from the perspective of FIG. 5) of the recess 54 in the mounting surface 26 is sized so as to be a close fit with that of the mounting lug 52. However, the lateral width (from left to right from the perspective of FIG. 5) of the recess 54 is larger than that of the mounting lug 52. As such, the recess 54 forms a guideway, preventing longitudinal movement of the mounting lug 52 but allowing lateral movement. The guideway would also allow vertical (from the perspective of FIG. 5) movement of the lug, however this is prevented by the bolt 29.

The mounting lug 52 is secured at the desired lateral point within the recess 54 using a pair of counterposed set screws 66a, 66b, received in laterally-aligned threaded bores 68 in the first support arm. The mounting lug 52 can be moved left (from the perspective of FIG. 5) by loosening screw 66a and tightening screw 66b, or right (from the perspective of FIG. 5) by loosening screw 66b and tightening screw 66a. The mounting lug 52 is secured in the desired location by tightening both set screws 66a, 66b so as to clamp it in place. Since the mounting lug 52 is securable at any point between the lateral end-walls of the recess 54, the alignment bracket 28 is securable at any location within a lateral continuum.

Figure 6:
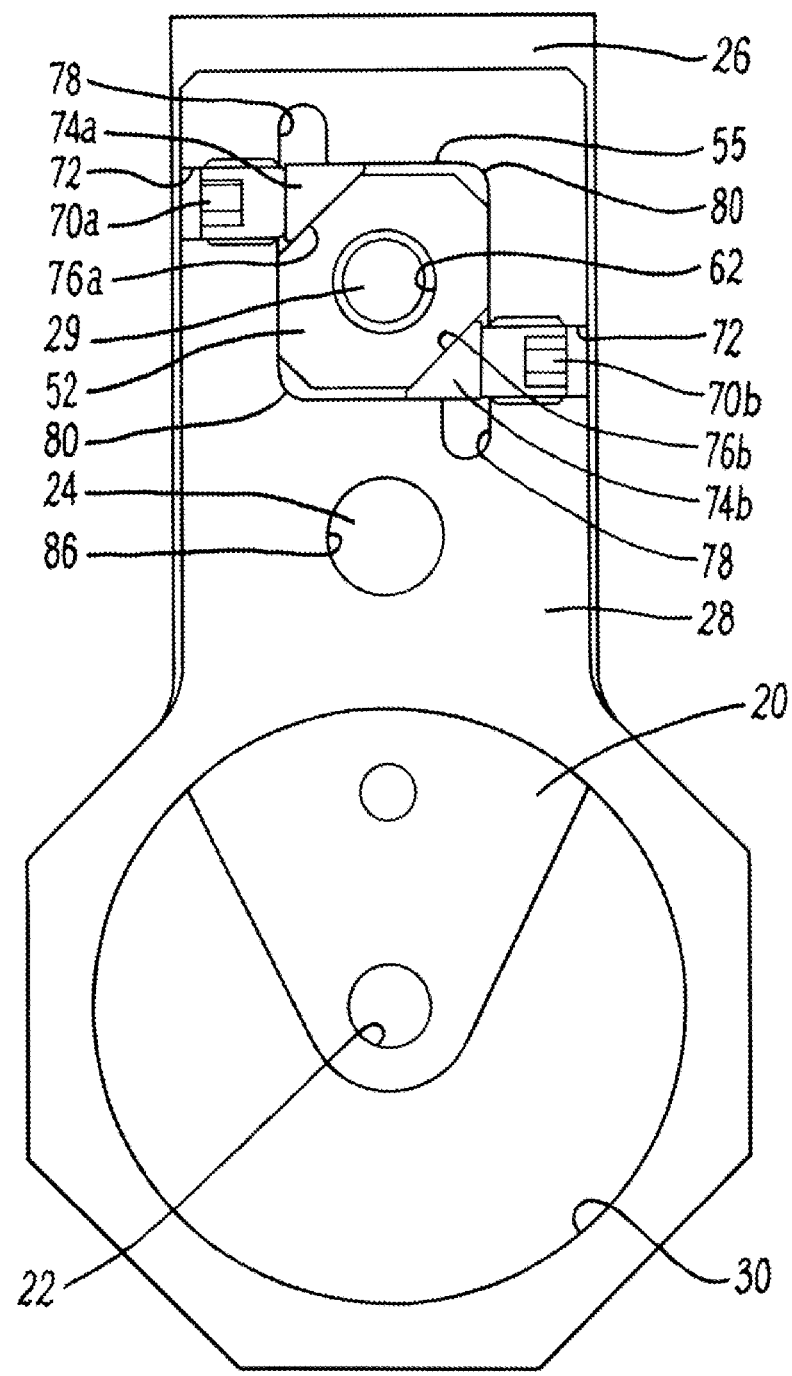
FIG. 6 is a cross-sectional plan view of part of the tool head assembly of the first embodiment.
Figure 7:
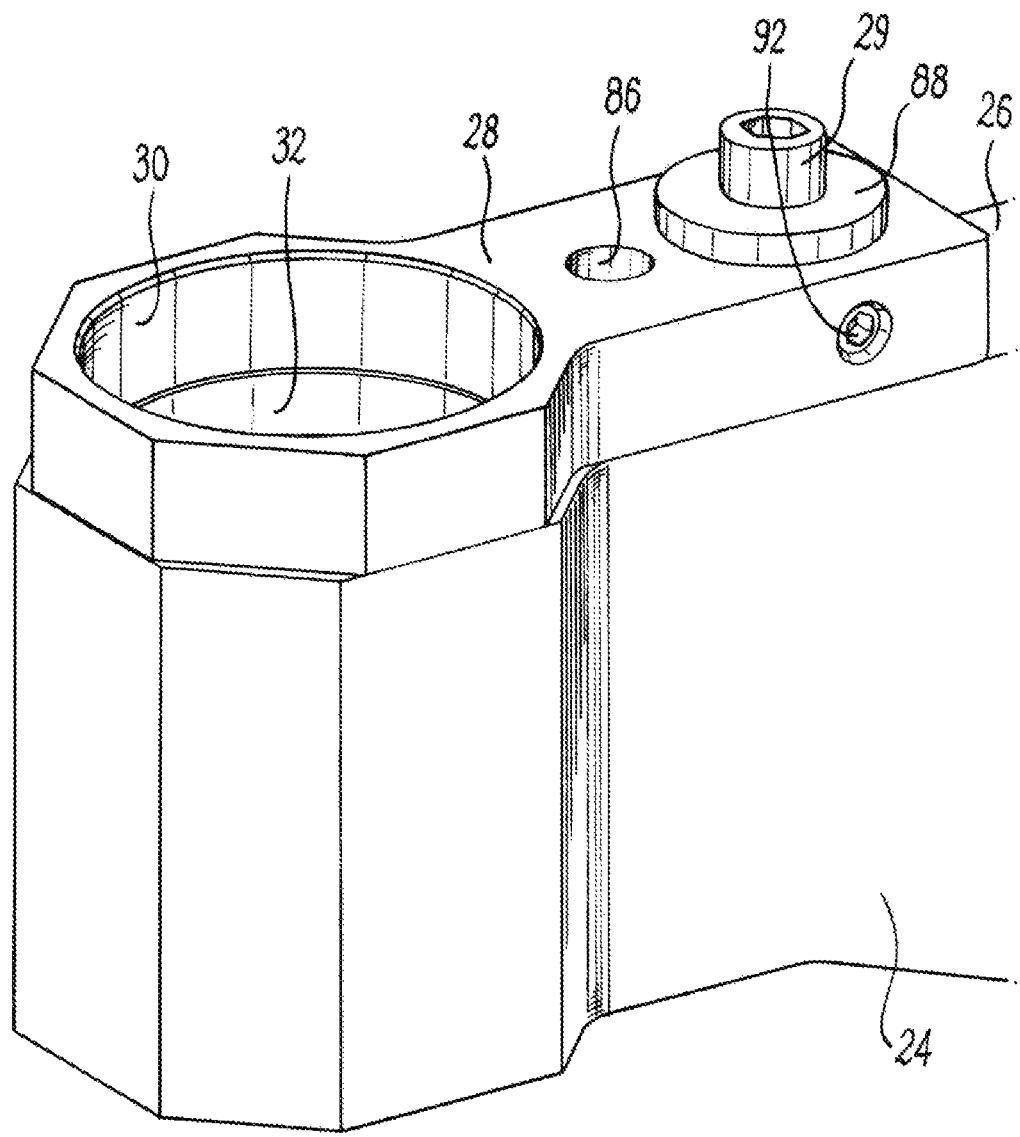
FIG. 7 is a perspective view of a first support arm of a second embodiment of the invention.

FIG. 6 shows a cross section of the first support arm 24, in a vertical plane (from the perspective of FIGS. 1-3 and 5), at a position which cuts through both the mounting lug 52 and the alignment bracket 28. This figure shows the mechanism by which the longitudinal location of the lug can be adjusted. The lateral width (the width from left to right from the perspective of FIG. 6) of the aperture 55 in the alignment bracket 28 is sized so as to be a close fit with that of the mounting lug 52. However, the longitudinal length (the vertical length from the perspective of FIG. 6) of the aperture 55 is larger than that of the mounting lug 52. As such, the aperture 55 forms a guideway which prevents lateral movement of the alignment bracket 18 relative to the mounting lug 52 but allows longitudinal movement. This guideway 55 would also allow vertical (into the page from the perspective of FIG. 6) movement of the alignment bracket 28, however this is prevented by the bolt 29.

The alignment bracket 28 is secured at the desired longitudinal point relative to the mounting lug 52 using a further pair of counterposed set screws 70a, 70b, received in laterally-aligned threaded bores 72 in the first support arm 24. Each set screw 70a, 70b acts on a corresponding wedge member 74a, 74b, each of which has a cam surface 76a, 76b.

The alignment bracket 28 can be moved in the longitudinally distal direction (downwards from the perspective of FIG. 6) by loosening screw 70a and tightening screw 70b. Tightening set screw 70b urges wedge member 74b against the mounting lug 52, and the cam surface 76b of this wedge member urges the mounting lug 52 in the longitudinally proximal direction (upwards from the perspective of FIG. 6) relative to the alignment bracket 28. As the mounting lug is longitudinally fixed by the recess (54 in FIG. 5) in the mounting surface 26, this results in the alignment bracket 28 moving in the longitudinally distal direction along the mounting surface 26. During this movement, the mounting lug 52 cams wedge member 76a to the left (from the perspective of FIG. 6), into space provided by the loosening of set screw 70a.

Similarly, the alignment bracket 28 can be moved in the longitudinally proximal direction (upwards from the perspective of FIG. 6) by loosening screw 70b and tightening screw 70a. Tightening set screw 70a urges wedge member 74a against the mounting lug 52, and the cam surface 76a of this wedge member urges the mounting lug 52 in the longitudinally distal direction (downwards from the perspective of FIG. 6) relative to the alignment bracket 28. As the mounting lug is longitudinally fixed by the recess (54 in FIG. 5) in the mounting surface 26, this results in the alignment bracket 28 moving in the longitudinally proximal direction along the mounting surface 26. During this movement, the mounting lug 52 cams wedge member 76b to the right (from the perspective of FIG. 6), into space provided by the loosening of set screw 70b.

The alignment bracket 28 is secured in the desired longitudinal location relative to mounting lug 52 by tightening both set screws 70a, 70b so as to clamp the mounting lug in the desired position within the cavity 55. Since the alignment bracket 28 is securable relative to the mounting lug 52 at any point in which the mounting lug is between the longitudinal end-walls of the cavity 55, the alignment bracket 28 is also securable at any location within a longitudinal continuum. Since the alignment bracket 28 is also securable at any location within a lateral continuum, in this embodiment the alignment bracket is securable at any location within a planar continuum (the planar continuum being coplanar with the mounting surface 26.

The components which secure the alignment bracket 28 at the required position on the mounting surface 26 are collectively referred to as the clamp assembly. In this embodiment the clamp assembly comprises the mounting lug 52, bolt 29, set screws 66a, 66b, 70, 70b and wedge members 74a, 74b. As described above, in this embodiment the clamp assembly also forms the mechanism by which the alignment bracket 28 can be moved between locations on the mounting surface 26. In other embodiments however, the clamp assembly may be configured solely to secure the alignment bracket in a location to which it has been moved by different means (such as manual manipulation).

It is to be noted that the detents 78 in the longitudinal end-walls of the cavity 55 are merely artefacts of the milling process by which the alignment bracket 28 is manufactured. They are necessary so as to avoid the presence of rounded corners 80 of the cavity 55 in positions which would obstruct movement of the wedge members 74a 74b. In addition, it is noteworthy that in FIG. 6 the anvil (8 in FIG. 1) is not shown.

The first support arm 24 of the force reaction frame of a second embodiment of the invention is shown in FIGS. 7-10. It will be apparent that the second embodiment is similar to the first, therefore only the differences will be described here.

In the second embodiment the bolt 29 acts on the alignment bracket 28, so as to clamp it against the mounting surface 26, through a washer 88. This is necessary due to the cavity 55 in the alignment bracket being open-topped (that is to say that the cavity is exposed when the alignment bracket 28 is secured on the mounting surface 26). In addition, the cavity 55 is both longitudinally and laterally larger than the mounting lug 55. Furthermore, the recess 54 in the mounting surface 26 has an interference fit with the mounting lug 52, so that the mounting lug is longitudinally and axially fixed relative to the first support arm 24. As such, the location of the alignment bracket 28 on the mounting surface 26 is determined solely by the location of the alignment bracket 28 relative to the mounting lug 52.

Figure 8:
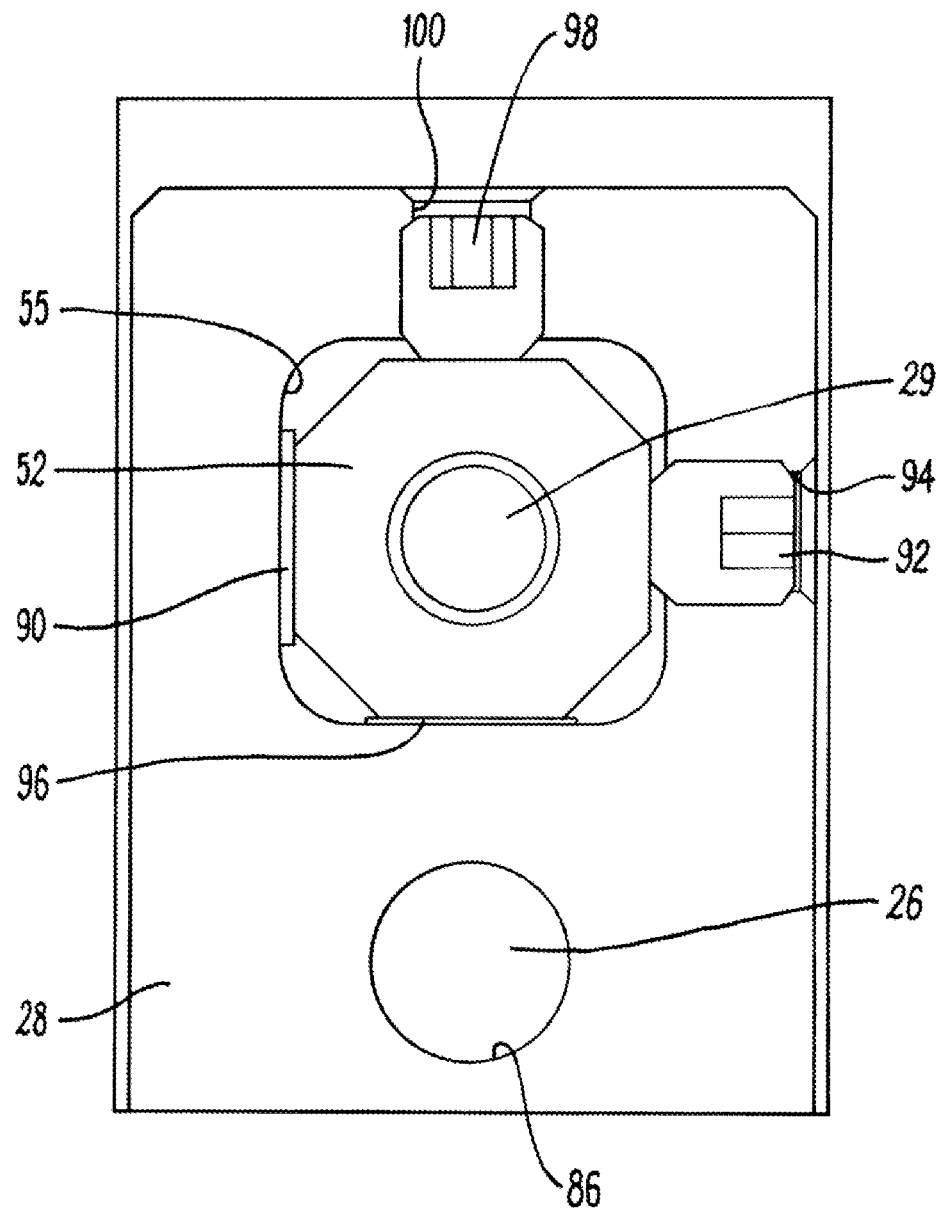
FIG. 8 is a cross-sectional plan view of part of the first support arm of the second embodiment
Figure 9:
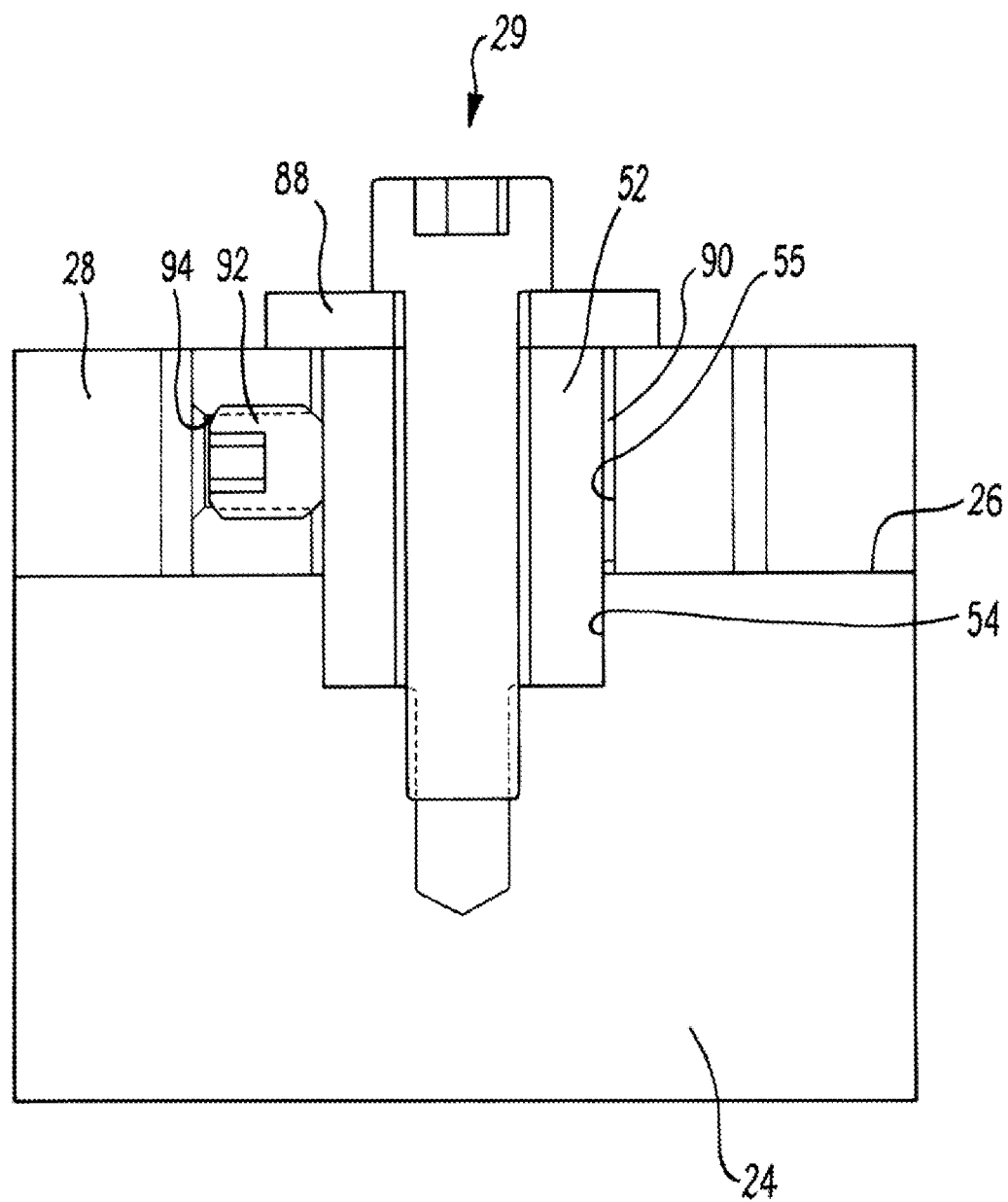
FIG. 9 is a longitudinal cross-section of the first support arm of the second embodiment.

The mechanism by which the alignment bracket 28 can be moved laterally is shown in FIGS. 8 and 9. FIG. 8 shows a cross-section of the first support arm 24, in a vertical plane (from the perspective of FIG. 7) at a position which cuts through both the mounting lug 52 and the alignment bracket 28. FIG. 9 shows a longitudinal cross section (the longitudinally distal direction running into the page). In this embodiment the alignment bracket 28 is secured laterally relative to the mounting lug 52 (and thus relative to the mounting surface 26) using a shim 90, and a set screw 92 received within a laterally-aligned threaded bore 94. The set screw 92 clamps the mounting lug 52 against the shim 90. To move the alignment bracket 28 to the left from the perspective of FIG. 8 (to the right in FIG. 9), the set screw 92 is loosened, the shim 90 is exchanged for a thinner one, and the set screw is retightened so as to secure the alignment bracket in place. The cavity 55 being open-topped allows easier access to it so as to change shims (although the bolt and washer must be removed to provide access). Similarly, to move the alignment bracket to the right from the perspective of FIG. 8 (to the left in FIG. 9), the set screw 92 is loosened, the shim 90 is exchanged for a thicker one, and the set screw is tightened again to secure the alignment bracket 28 in place.

Figure 10:
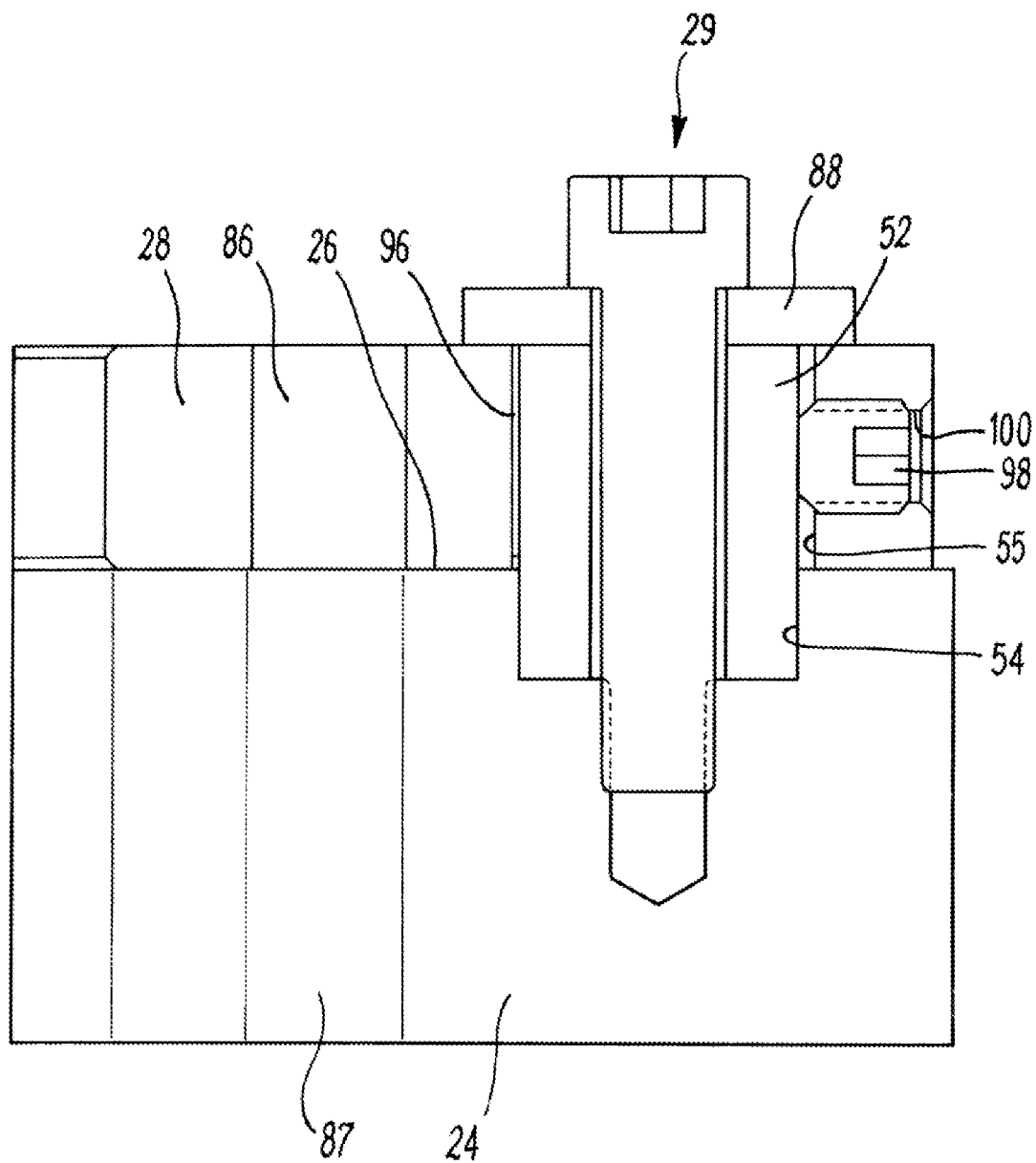
FIG. 10 is a lateral cross-section of part of the first support arm of the second embodiment.

The mechanism by which the alignment bracket 28 can be moved longitudinally is shown in FIGS. 8 and 10. FIG. 10 shows a lateral cross section of the first support arm 24. This mechanism is substantially the same as that by which the alignment bracket 28 can be moved laterally. The alignment bracket 28 is secured longitudinally relative to the mounting lug 52 (and thus relative to the mounting surface 26) using a shim 96, and a set screw 98 received within a longitudinally-aligned threaded bore 100. The set screw 98 clamps the mounting lug 52 against the shim 96. To move the alignment bracket 28 in the longitudinally distal direction (downwards from the perspective of FIG. 8, to the left in FIG. 10), the set screw 98 is loosened, the shim 96 is exchanged for a thicker one, and the set screw is retightened so as to secure the alignment bracket in place. To move the alignment bracket in the longitudinally proximal direction (upwards from the perspective of FIG. 8, to the right from the perspective of FIG. 10), the set screw 92 is loosened, the shim 90 is exchanged for a thinner one, and the set screw is tightened again to secure the alignment bracket 28 in place.

In this embodiment, the clamp assembly comprises the mounting lug 52, bolt 29, washer 88, set screws 92, 98 and shims 90, 96. The clamp assembly may also comprise further shims (not visible) for which with shims 90 and/or 96 can be exchanged so as to alter the position of the alignment bracket 28 on the mounting surface 26. Alternatively, the clamp assembly may comprise no other shims (at which point the alignment bracket 28 would be movable only by swapping the positions of shims 90, 96, or removing one or both altogether). As the alignment bracket 28 is secured using shims, it may be considered to be movable between a plurality of discrete locations in that it may only be secured in locations for which shims of the correct thickness are available. However, as shims are manufacturable in any desired size, the alignment bracket 28 of the second embodiment may also be considered to be securable in any location within a planar continuum.

One advantage of the second embodiment is that it does not require any threaded bores to be present in the first support arm 24. This is beneficial because such holes reduce the strength of the first support arm 24 (which is subjected to high loads), and in addition because the material is difficult to machine (small holes).

Figure 11:
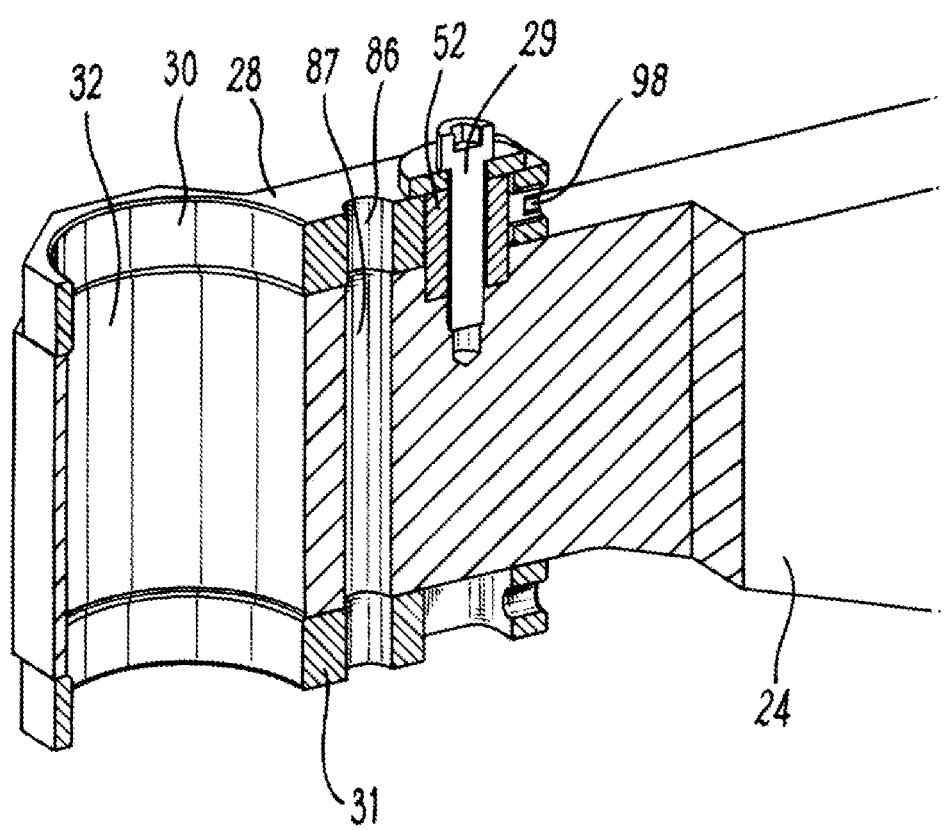
FIG. 11 is a partial cross-section of a modified second embodiment of the invention.

A modified embodiment of the invention is shown in FIG. 11. The modified embodiment corresponds with the second embodiment as shown in FIGS. 7-10 and described above, except that a second alignment bracket 31 is located on an opposite side of the first support arm 24 (i.e. underneath the first support arm). Components described above in relation to the second embodiment are used to secure the second alignment bracket 31 to the first support arm 24. These component are omitted from FIG. 11. The modified embodiment may provide greater stability of the orientation of the actuator (not shown) because it holds the actuator at two axially separated locations. The second alignment bracket 31 may be used for example during alignment of the actuator and then removed before the actuator retention assembly 34 (see FIG. 1) is fitted and tightened. Alternatively, the second alignment bracket 31 may remain in place after alignment of the actuator and during operation of the actuator.

Although the second alignment bracket 31 is shown in connection with the second embodiment of the invention, a second alignment bracket may be used in connection with any embodiment of the invention.

In an embodiment, a single alignment bracket may be provided on the underneath of the first support arm 24 without an alignment bracket being provided on top of the first support arm.

FIG. 11 shows a hole 86 in the alignment bracket 28 and a bore 87 which passes through the first support arm 24. The hole 86 is also visible in FIGS. 3 and 7-10 but has not been described further above because its function is most easily understood in connection with the cross-sectional view provided by FIG. 11. The hole 86 and bore 87 (together with a hole 89 in the second alignment bracket 31 if present) receive a bolt (not shown). The bore 87 is oversized relative to the diameter of the bolt such that lateral movement of the alignment bracket 28 can take place when the bolt is in situ. This allows alignment of the actuator to be performed in the manner explained further above. When the actuator has been aligned a nut may be screwed onto the bolt and tightened, thereby clamping the alignment bracket 28 to the first support arm 24. This provides a second point at which the alignment bracket 28 is secured to the first support arm 24. This is advantageous because it prevents any pivoting movement about the bolt 29 which could otherwise occur (e.g. during tightening of the actuator retention assembly 34 (see FIG. 1)).

It will be appreciated that numerous modifications to the above described design may be made without departing from the scope of the invention as defined by the appended claims. For instance, although the invention has been described herein in relation to SPR, it may equally be used in any other suitable type of spot-joining apparatus, such as a friction-stir spot welding, solid riveting, clenching or electric spot welding tool. In addition, although the above embodiments describe apparatus in which the alignment bracket is clamped against the mounting surface, in other embodiments it may be prevented from lifting from the mounting surface by any other suitable mechanism. For instance, it may be clamped against the mounting surface by an actuator retention assembly which secures an actuator relative to the actuator receiving portion.

Although in the above embodiments the alignment bracket is movable along longitudinal and lateral axes, in other embodiments it may be movable in any suitable direction or combination of directions (which may or may not be perpendicular to one another). Further, although particular features of mechanisms for securing the alignment bracket on the mounting surface have been described in combination, this should not be construed as limiting. Each feature may be present alone, or in combination with any other feature of any embodiment. For instance, in a modification of the second embodiment, the set screw in the longitudinally aligned threaded bore may instead be located in an additional laterally-aligned threaded bore and act on the mounting lug 52 via a wedge member.

Whilst the above described actuator retention assembly utilises two discrete flanges, in other embodiments one flange may be integral to the actuator, and/or one may be integral to the support arm on which the actuator is mounted. Instead or in addition, the actuator retention assembly may utilise nuts rather than bolts. For instance, one flange may have threaded protrusions which project through apertures in the other flange, the flanges being urged together by tightening nuts onto the ends of said projections. In another alternative arrangement, the actuator retention assembly may utilise both nuts and bolts, for instance, each bolt may project through non-threaded bores in both flanges and into a nut, the flanges being movable towards each other by tightening the nuts and/or the bolts.

Although in the second embodiment the shims are planar sheet members, in other embodiments they may take any other suitable form. For instance, they may be wedge-shaped, tapering from top to bottom from the perspective of FIGS. 9 and 10. This may allow the shims to be inserted by pressing or hammering, rather than by dropping them in place and tightening a set screw.

In the described embodiments, the clamp assembly is separate a separate entity to the actuator retention assembly. However, in embodiments where the actuator engages with an alignment bracket, a single mechanism may form the clamp assembly and the actuator retention assembly. For instance, one such arrangement may correspond to the first embodiment except that the alignment bracket is freely slidable on the mounting surface (i.e. there is no bolt or mounting lug). In this case, the alignment bracket would be secured in the required location on the mounting surface by the actuator retention assembly squeezing it between the mounting surface and the shoulder of the actuator. In addition, although in the above embodiments the clamp assembly secures the alignment bracket in the required location and also holds it against the mounting surface, in other embodiments this may not be the case. One such arrangement may correspond to the apparatus of the second embodiment except that the washer is absent so that the bolt acts only on the mounting lug. In this case, the clamp assembly would secure the alignment bracket in the required location on the mounting surface (i.e. prevent it from moving on the mounting surface to a different location), but the alignment bracket would only be prevented from lifting off the mounting surface by the actuator retention assembly. In other words, in some arrangements the clamp assembly secures the mounting bracket in the required location on the mounting surface but does not hold the alignment bracket against the mounting surface, and in other embodiments the clamp assembly may secure the mounting bracket in the required location partially or solely by holding the alignment bracket against the mounting surface.

A benefit provided by embodiments of the invention is that they allow an actuator to be removed and replaced without the need to go through a realignment process.

The described and illustrated embodiments are to be considered as illustrative and not restrictive in character, it being understood that only preferred embodiments have been shown and described and that all changes and modifications that come within the scope of the invention as defined in the claims are desired to be protected. In relation to the claims, it is intended that when words such as "a," "an", "at least one", or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. Features disclosed in relation to one aspect of the invention may be utilised in one or more other aspects of the invention, where appropriate.

The invention claimed is:

1. A spot-joining apparatus comprising:
   a substantially C-shaped force reaction frame (4) having a hub portion (16) and first and second support arms (24, 20) projecting therefrom;
   an anvil (8) received in an anvil receiving portion (22) of the second support arm;
   an actuator (6) for driving a tool nose assembly (12); and
   a mounting assembly, wherein:
   the mounting assembly comprises the first support arm;
   the first support arm has a mounting surface, and receiving portion which receives the actuator;
   the mounting assembly also comprises an alignment bracket which engages with said actuator;
   the alignment bracket is movable between a plurality of locations on the mounting surface of the first support arm, such that the actuator engaged with the alignment bracket is movable between a plurality of locations relative to the first support arm; and
   the mounting assembly further comprises a clamp assembly comprising at least one screw camming against a member with an angular surface configured to secure the alignment bracket in any of said plurality of locations.

2. The mounting assembly according to claim 1, wherein the receiving portion comprises a bore which is oversized relative to the actuator.

3. The mounting assembly according to claim 1 wherein the alignment bracket is movable to any location on the mounting surface within a continuum.

4. The mounting assembly according to claim 1 wherein said plurality of locations are spaced along the longitudinal axis of the first support arm.

5. The mounting assembly according to claim 1 wherein said plurality of locations are spaced across the lateral width of the first support arm.

6. A spot-joining apparatus mounting assembly, wherein:
   the mounting assembly comprises a first support arm;
   the first support arm has a mounting surface, and receiving portion configured to receive an actuator;
   the mounting assembly also comprises an alignment bracket configured to engage with said actuator;
   the alignment bracket is movable between a plurality of locations on the mounting surface of the first support arm; and
   the mounting assembly further comprises a clamp assembly configured to secure the alignment bracket in any of said plurality of locations,
   wherein the clamp assembly comprises a mounting lug,
   wherein the mounting lug is securable relative to both the alignment bracket and the mounting surface, and
   wherein the alignment bracket is movable between said plurality of locations on the mounting surface due to the mounting lug being movable relative to at least one of the alignment bracket, and the mounting surface, between a plurality of locations.

7. The mounting assembly according to claim 6 wherein the mounting lug is securable relative to the alignment bracket, and/or the mounting surface, using one or more set screws.

8. The mounting assembly according to claim 7 wherein the mounting lug is securable relative to the alignment bracket, and the mounting surface, using one or more pairs of counterposed set screws.

9. The mounting assembly according to claim 7 wherein at least one of said set screws is positioned to act on a wedge member, the wedge member having a cam surface positioned whereby tightening the at least one set screw urges the mounting lug, and the alignment bracket and the mounting surface, to move relative to one another and thereby move the alignment bracket towards at least one of said plurality of locations.

10. The mounting assembly according to claim 6 wherein the mounting lug is securable relative to the alignment bracket, and the mounting surface, using one or more shims.

11. The mounting assembly according to claim 6 wherein the alignment bracket or the mounting surface defines a guideway in which at a least portion of the mounting lug is slidably received, or the mounting lug defines a guideway in which at least a portion of the alignment bracket or first support arm is slidably received, the guideway being positioned to limit the relative motion of the mounting lug and the alignment bracket, or of the mounting lug and the mounting surface.

12. The mounting assembly according to claim 1 further comprising an actuator retention assembly configured to clamp the actuator to the mounting assembly, wherein the actuator retention assembly comprises a plurality of fasteners positioned circumferentially around the actuator.

13. A mounting assembly comprising:
   a substantially C-shaped force reaction frame (4) having a hub portion (16) and first and second support arms (24, 20) projecting therefrom;
   an anvil (8) received in an anvil receiving portion (22) of the second support arm;
   an actuator (6) for driving a tool nose assembly (12);
   a mounting assembly for a spot-joining apparatus, the mounting assembly comprises the first support arm (24);
   wherein the first support arm has a mounting surface (26), and receiving portion configured to which receives the actuator (6);
   the mounting assembly also comprises an alignment bracket (28) configured which engages with said actuator;
   the alignment bracket is movable between a plurality of locations on the mounting surface of the first support arm, such that the actuator engaged with the alignment bracket is movable between a plurality of locations relative to the first support arm; and
   the mounting assembly further comprises an actuator retention assembly comprising at least three fasteners and at least three elastomeric flanges positioned circumferentially around the actuator, wherein each of the at least three fasteners is surrounded by a respective one of the at least three elastomeric flanges, and wherein the elastomeric flanges are configured to cam against the alignment bracket to secure the alignment bracket to any of said plurality of locations.

14. The mounting assembly according to claim 1 further comprising a second support arm which has a receiving portion configured to receive the anvil, the mounting assembly defining a span between the receiving portion of the first support arm and the receiving portion of the second support arm.

15. The mounting assembly according to claim 14 wherein the mounting surface faces away from the second support arm.

16. The mounting assembly according to claim 14 wherein the mounting surface is substantially perpendicular to the span.

17. The mounting assembly according to claim 1 further comprising a second alignment bracket configured to engage with said actuator, the second alignment bracket being movable between a plurality of locations on a second mounting surface of the first support arm, the clamp assembly configured to secure the second alignment bracket in any of said plurality of locations.

18. The mounting assembly according to claim 6 wherein the mounting lug is securable relative to the alignment bracket, or the mounting surface, using one or more set screws.

19. The mounting assembly according to claim 7 wherein the mounting lug is securable relative to the alignment bracket, or the mounting surface, using one or more pairs of counterposed set screws.

20. The mounting assembly according to claim 7 wherein at least one of said set screws is positioned to act on a wedge member, the wedge member having a cam surface positioned whereby tightening its associated set screw urges the mounting lug, and the alignment bracket or the mounting surface, to move relative to one another and thereby move the alignment bracket towards at least one of said plurality of locations.

21. The mounting assembly according to claim 6 wherein the mounting lug is securable relative to the alignment bracket, or the mounting surface, using one or more shims.

\* \* \* \* \*